(12) United States Patent
Magham et al.

(10) Patent No.: US 10,701,572 B2
(45) Date of Patent: Jun. 30, 2020

(54) PROVISIONING OF SIMS FOR A TESTING ENVIRONMENT OF A WIRELESS COMMUNICATIONS NETWORK

(71) Applicant: T-Mobile USA, Inc., Bellevue, WA (US)

(72) Inventors: Praveen Yoga Venkata Magham, Bellevue, WA (US); Chirag Desai, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 9 days.

(21) Appl. No.: 15/672,156

(22) Filed: Aug. 8, 2017

(65) Prior Publication Data

US 2019/0053078 A1 Feb. 14, 2019

(51) Int. Cl.
*H04W 24/06* (2009.01)
*H04M 15/00* (2006.01)
*H04W 76/11* (2018.01)
*H04W 4/24* (2018.01)
*H04L 12/26* (2006.01)
*H04W 8/04* (2009.01)
*H04W 4/50* (2018.01)
*H04W 8/18* (2009.01)

(52) U.S. Cl.
CPC ............ *H04W 24/06* (2013.01); *H04L 43/50* (2013.01); *H04M 15/73* (2013.01); *H04M 15/7556* (2013.01); *H04W 4/24* (2013.01); *H04W 76/11* (2018.02); *H04L 43/0811* (2013.01); *H04W 4/50* (2018.02); *H04W 8/04* (2013.01); *H04W 8/18* (2013.01)

(58) Field of Classification Search
CPC ....... H04W 24/06; H04W 76/11; H04W 8/04; H04W 4/50; H04M 15/7556; H04L 43/0811
See application file for complete search history.

(56) References Cited

U.S. PATENT DOCUMENTS

| | | | |
|---|---|---|---|
| 10,097,981 B1* | 10/2018 | Talaganov | H04W 4/90 |
| 2010/0083045 A1* | 4/2010 | Qiu | H04L 43/50 |
| | | | 714/27 |
| 2014/0223538 A1* | 8/2014 | Van De Velde | H04L 12/2867 |
| | | | 726/12 |
| 2016/0007188 A1* | 1/2016 | Wane | H04W 4/50 |
| | | | 455/419 |
| 2016/0255192 A1* | 9/2016 | Poon | H04W 4/70 |
| | | | 455/435.1 |
| 2016/0255513 A1* | 9/2016 | Lihosit | H04W 24/02 |
| | | | 455/419 |

* cited by examiner

*Primary Examiner* — Justin T Van Roie
(74) *Attorney, Agent, or Firm* — Lee & Hayes, P.C.

(57) ABSTRACT

A wireless communication network includes a testing environment that comprises a plurality of nodes. One or more nodes of the wireless communication network are selected for performing at least one of (i) one or more tests or (ii) one or more procedures. A listing of a plurality of subscriber identity modules (SIMs) provisioned in a home location register for use in the testing environment is provided on a testing platform. Based upon the one or more nodes, a SIM is selected for use in accessing the one or more nodes. Based upon the SIM, data from the at least one of (i) one or more tests or (ii) one or more procedures is provisioned with respect to a primary key of the SIM. The at least one of (i) one or more tests or (ii) one or more procedures is performed with respect to the one or more nodes.

20 Claims, 4 Drawing Sheets

PROVISIONING OF SIMS FOR A TESTING ENVIRONMENT OF A WIRELESS COMMUNICATIONS NETWORK

BACKGROUND

In recent years, telecommunication devices have advanced from offering simple voice calling services within wireless communication networks to providing users with many new features. Telecommunication devices now provide messaging services such as email, text messaging, and instant messaging; data services such as Internet browsing; media services such as storing and playing a library of favorite songs; location services; and many others. Thus, telecommunication devices, referred to herein as user devices or mobile devices, are often used in multiple contexts. In addition to the new features provided by the telecommunication devices, users of such telecommunication devices have greatly increased. Such an increase in users is only expected to continue and in fact, it is expected that there could be a growth rate of twenty times more users in the next few years alone.

Wireless communication networks generally provide services to users via a plurality of nodes or servers. Often, as new services are provided by wireless communication networks, servers that provide the services need to be updated, configured, etc. The servers also need to be tested and/or validated once the changes are made for the potential services. However, various teams of engineers associated with the wireless communication network handle different nodes and provide different services. Nodes are generally accessed by provisioning subscriber identity modules (SIMs) of mobile devices that allow for access to the nodes through a testing environment of the wireless communication network. Accordingly, various teams generally have SIMs that are associated with their mobile devices that allow them access to their specific nodes within the testing environment of the wireless communication network. Thus, when one team or member of a team needs to access a server within the wireless communication network that is handled by another team, it can take a large amount of time, e.g., up to several days, before the node can be accessed.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
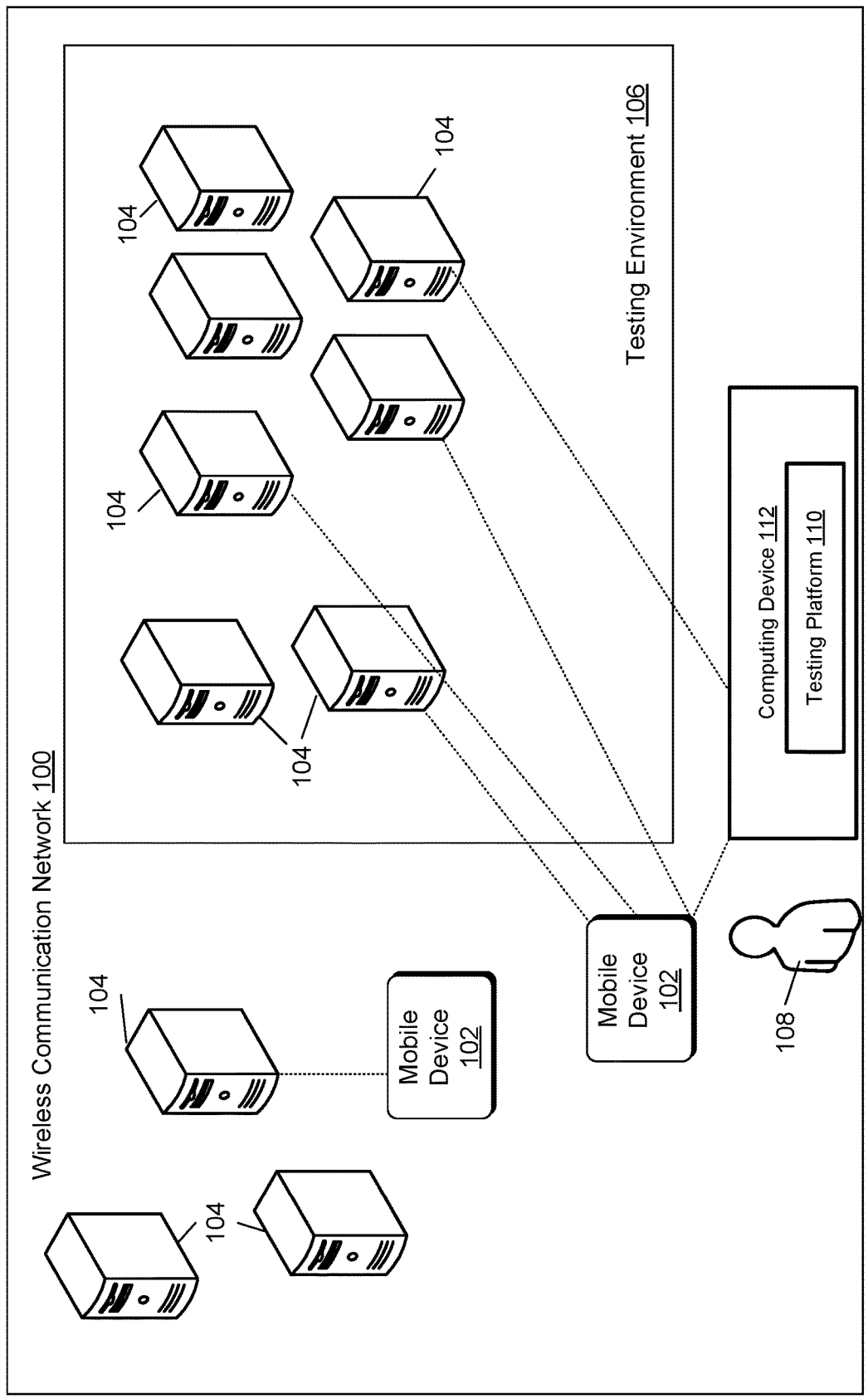
FIG. 1 schematically illustrates a wireless communication network that includes a testing environment, in accordance with various embodiments.

Described herein are techniques and an architecture for providing subscriber identity modules (SIMs) that are provisioned to allow mobile devices to access various nodes within a testing environment within a wireless communication network and provision data for various tests and procedures performed on the accessed nodes.

Generally, the wireless communication network provides services to mobile devices that register, e.g. access, the wireless communication network. The wireless communication network may provide various services through various nodes implemented via servers such as, for example, voice service (e.g., telephone service), messaging services, Internet access, etc. In order to receive such services, the mobile device registers with the wireless communication network. Generally, this registration occurs through a server (node), which is generally one of a plurality of servers. For example, the server may belong to a global system for mobile communications (GSM) network and thus, mobile devices may register with the network via a mobile switching station (MSS) server. Generally, the MSS server controls the networking switching subsystem elements of the network.

When problems occur with one or more servers, an engineer or technician may wish to access the one or more servers via a testing environment of the wireless communication network. Such access occurs when the technician registers the technician's mobile device with the wireless communication network via the testing environment or network. While accessing servers via the testing environment, the technician may troubleshoot the server to determine the problem with the server and attempt to fix the problem. Additionally, the technician may wish to access one or more servers within the pool of servers in order to configure the one or more servers, upload software to the one or more servers, upgrade software on the one or more servers, etc.

In embodiments, a testing platform is provided that can be executed on a computing device (including mobile devices). The testing platform may be utilized to perform various tests and validation procedures within a testing environment of the wireless communication network. The testing platform includes a listing of subscriber identity modules (SIMs) provisioned within a home location register. In embodiments, the home location register comprises a unified subscriber database (USD). The SIMs are provisioned for use within the testing environment to perform various tests and validation processes by allowing access to various nodes of the wireless communication network via the testing environment.

In configurations, the SIMs correspond to physical SIM cards that are placed within a mobile device configured to access the testing environment of the wireless computing network. In other configurations, the SIMs correspond to virtual SIMs that are included within a mobile device configured to access the testing environment of the wireless communication network. Additionally, in other configurations, the SIMs correspond to embedded SIMs (e-SIMs or eSIMs), which may be non-replaceable embedded chips in small outline, no leads packages (e.g., SON-8 packages) that may be soldered directly onto a circuit board. The embedded SIMs generally have machine to machine (M2M) and remote SIM provisioning capabilities.

In embodiments, the testing platform may also include various tests and configuration processes for execution on various nodes within the testing environment. The testing platform may also allow for a user (e.g., an engineer or technician) to add or provide various tests for execution on nodes within the testing environment.

A user that wishes to perform tests, configuration processes, update processes, validation processes, etc., may access the testing platform via a computing device or a mobile device. The user may then select a SIM based upon one or more nodes that need to be accessed. The testing may be with respect to, for example, a radio access network (RAN) node, an internet protocol core multi-media system (IMS) node, messaging applications, data services, etc.

Based upon the selected SIM, the data is provisioned with respect to the appropriate primary key of the SIM. In configurations, the primary key is an international mobile subscriber identity (IMSI)/mobile station international subscriber directory number (MSISDN) of the SIM. Once the provisioning with respect to the primary key has been successfully completed, the testing, configuration processes, validation processes, etc. may begin and data may be provided with respect to the primary key, either via the testing platform or the user's computing device.

FIG. 1 schematically illustrates a wireless communication network 100 that provides services to mobile devices 102 (which may not necessarily be mobile) that register with the wireless communication network 100. Services provided within the wireless communication network 100 may include, for example, voice calling services (e.g. telephone calls), Internet access, messaging (e.g., short message service (SMS) messages, multi-media message service (MMS) messages, instant messaging (IM) messages, enhanced message service (EMS) messages, etc.), video services, etc. Such services are generally provided via various nodes implemented via servers 104 that the mobile devices 102 access, i.e. the mobile devices register with the wireless communication network 100 via a server 104. For example, if the wireless communication network 100 is configured as a Global System for Mobile Communications (GMA) network, then one or more of the servers 104 may be a mobile switching station (MSS) server. If the wireless communication network includes an Internet Protocol (IP) Multimedia Subsystem (IMS) network, then one or more of the servers may comprise a telephony application server (TAS), a call session control function (CSCF) server and/or a breakout gateway control function (BGCF) server. In embodiments, when the wireless communication network 100 includes an IMS network, the IMS network may provide various services such as, for example, voice over long term evolution (VoLTE) service, video over long term evolution (ViLTE) service and/or rich communication services (RCS).

In an embodiment, the mobile devices 102 may comprise any appropriate devices for communicating over a wireless communication network. Such devices include mobile telephones, cellular telephones, mobile computers, Personal Digital Assistants (PDAs), radio frequency devices, handheld computers, laptop computers, tablet computers, palmtops, pagers, as well as desktop computers, devices configured as Internet of Things (IoT) devices, integrated devices combining one or more of the preceding devices, and/or the like. As such, the mobile devices 102 may range widely in terms of capabilities and features. For example, one of the mobile devices 102 may have a numeric keypad, a capability to display only a few lines of text and be configured to interoperate with only GSM networks. However, another of the mobile devices 102 (e.g., a smart phone) may have a touch-sensitive screen, a stylus, an embedded GPS receiver, and a relatively high-resolution display, and be configured to interoperate with multiple types of networks. The mobile devices may also include SIM-less devices (i.e., mobile devices that do not contain a functional subscriber identity module ("SIM")), roaming mobile devices (i.e., mobile devices operating outside of their home access networks), and/or mobile software applications.

In an embodiment, the wireless communication network 100 may be configured as one of many types of networks and thus may communicate with the mobile devices 102 using one or more standards, including but not limited to GSM, Time Division Multiple Access (TDMA), Universal Mobile Telecommunications System (UMTS), Evolution-Data Optimized (EVDO), Long Term Evolution (LTE), Generic Access Network (GAN), Unlicensed Mobile Access (UMA), Code Division Multiple Access (CDMA) protocols (including IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), WiMAX protocols (including IEEE 802.16e-2005 and IEEE 802.16m protocols), High Speed Packet Access (HSPA), (including High Speed Downlink Packet Access (HSDPA) and High Speed Uplink Packet Access (HSUPA)), Ultra Mobile Broadband (UMB), and/or the like. In embodiments, as previously noted, the wireless communication network 100 may include an IMS network and thus, may provide various services such as, for example, voice over long term evolution (VoLTE) service, video over long term evolution (ViLTE) service and/or rich communication services (RCS).

In embodiments, the servers 104 may have different settings, different loaded software, different configurations, etc. Examples of servers 104 include, but are not limited to, a Mobile Switching Station (MSS) server, a Telephony Application Server (TAS), a Call Session Control Function (CSCF) server or a Breakout Gateway Control Function (BGCF) server.

As may be seen in FIG. 1, the wireless communication network 100 includes a testing environment 106. When servers 104 are accessed via the testing environment 106, a user 108 (e.g., a technician or engineer) may troubleshoot the servers, may wish to access one or more servers 104 in order to test the one or more servers 104, configure the one or more servers 104, validate new or existing services provided by the one or more servers 104, upload software to the one or more servers 104, upgrade software on the one or more servers 104, etc. Such access occurs when the technician registers a mobile device 102 with the wireless communication network 100 via the testing environment 106.

In embodiments, a testing platform 110 is provided that can be executed via a computing device 112 or a mobile device 102. The testing platform 110 may be utilized to perform various tests and validation procedures within the testing environment 106 of the wireless communication network 100.

The testing platform 110 includes a listing of subscriber identity modules (SIMs) provisioned within a home location register. In embodiments, the home location register comprises a unified subscriber database. The SIMs are provisioned by an operator of the wireless communication network 100 for use within the testing environment 106 to perform various tests and validation processes by allowing access to various servers 104 of the wireless communication network 100 via the testing environment 106.

In configurations, the SIMs correspond to physical SIM cards that are placed within a mobile device 102 configured to access the testing environment of the wireless computing network. In other configurations, the SIMs correspond to virtual SIMs that are included within a mobile device 102 configured to access the testing environment 106 of the wireless communication network 100. Additionally, in other configurations, the SIMs correspond to embedded SIMs (e-SIMs or eSIMs), which may be non-replaceable embedded chips in small outline, no leads packages (e.g., SON-8 packages) that may be soldered directly onto a circuit board. The embedded SIMs generally have machine to machine (M2M) and remote SIM provisioning capabilities.

In embodiments, the testing platform 110 may also include various tests and configuration processes for execution on various servers 104 within the testing environment 106. The testing platform 110 may also allow for the user 108 to add or provide various tests for execution on servers 104 within the testing environment 106. The testing may be with respect to, for example, a radio access network (RAN) node of the wireless communication network 100, an internet protocol core multi-media system (IMS) network node, messaging applications, data services, new services, etc.

When the user 108 wishes to perform tests, configuration processes, update processes, validation processes, etc., the user 108 accesses the testing platform 110 via the computing device 112 or a mobile device 102. The user 108 may then select a SIM based upon one or more servers 104 that need to be accessed. The selected SIM may be used by the computing device 112 or the mobile device 102 for accessing the servers 104. The selected SIM may be provided from one to the other depending on the situation and which device access the testing platform 110.

Based upon the selected SIM, the data is provisioned with respect to the appropriate primary key of the SIM. In configurations, the primary key is an international mobile subscriber identity (IMSI)/mobile station international subscriber directory number (MSISDN) of the SIM.

Once the provisioning with respect to the primary key has been successfully completed, the testing, configuration processes, update processes, validation processes, etc. may begin and be performed by either the mobile device 102 or the computing device 112. Data may be provided with respect to the primary key via the testing platform 110, which may be accessed via the computing device 112 or the mobile device 102.

Figure 2:
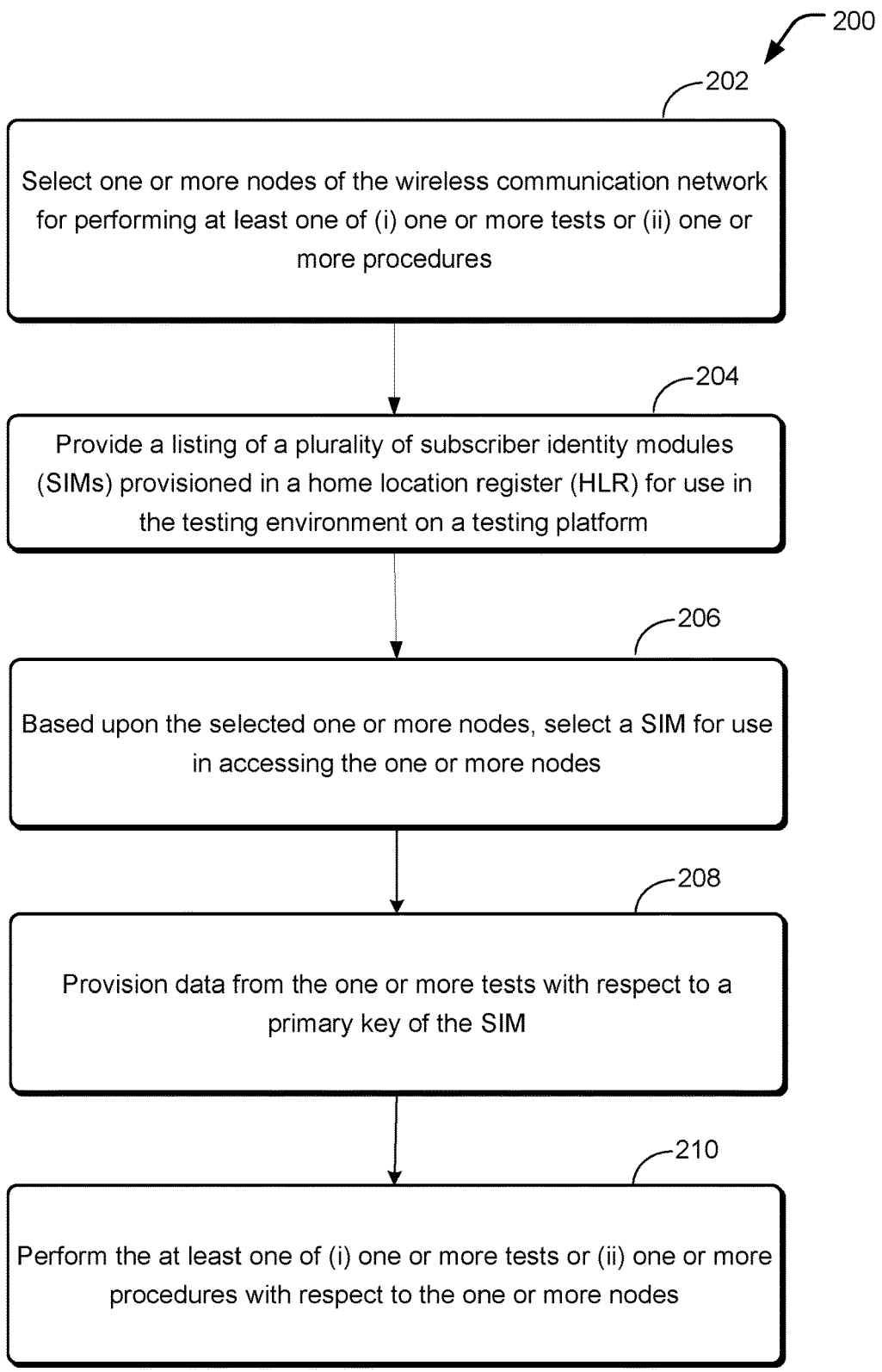
FIG. 2 is a flowchart illustrating an example method of testing or performing other procedures with respect to nodes of the wireless communication network of FIG. 1 via a testing environment, in accordance with various embodiments.

FIG. 2 is a flowchart illustrating a method 200 of testing or performing other procedures within a testing environment, e.g., testing environment 108, in a wireless communication network, e.g., wireless communication network 100 of FIG. 1. As illustrated, at block 202, one or more nodes of the wireless communication network are selected for performing at least one of (i) one or more tests or (ii) one or more procedures. At block 204, a listing of a plurality of subscriber identity modules (SIMs) provisioned in a home location register (HLR) for use in the testing environment is provided on a testing platform. At block 206, based upon the selected one or more nodes, a SIM is selected for use in accessing the one or more nodes. At block 208, data from the one or more tests is provisioned with respect to a primary key of the SIM. At block 210, the at least one of (i) one or more tests or (ii) one or more procedures are performed with respect to the one or more nodes.

Thus, SIMs that are provisioned for various engineering teams and/or team members that access the wireless communication network 100 via the testing platform 108 are centrally located and available. Various engineering team members can thus access the various SIMs in order to perform tests, configuration processes, validation processes, etc., on various nodes or servers 104 regardless of which engineering team generally accesses, e.g., controls, testing for the nodes or servers 104.

Figure 3:
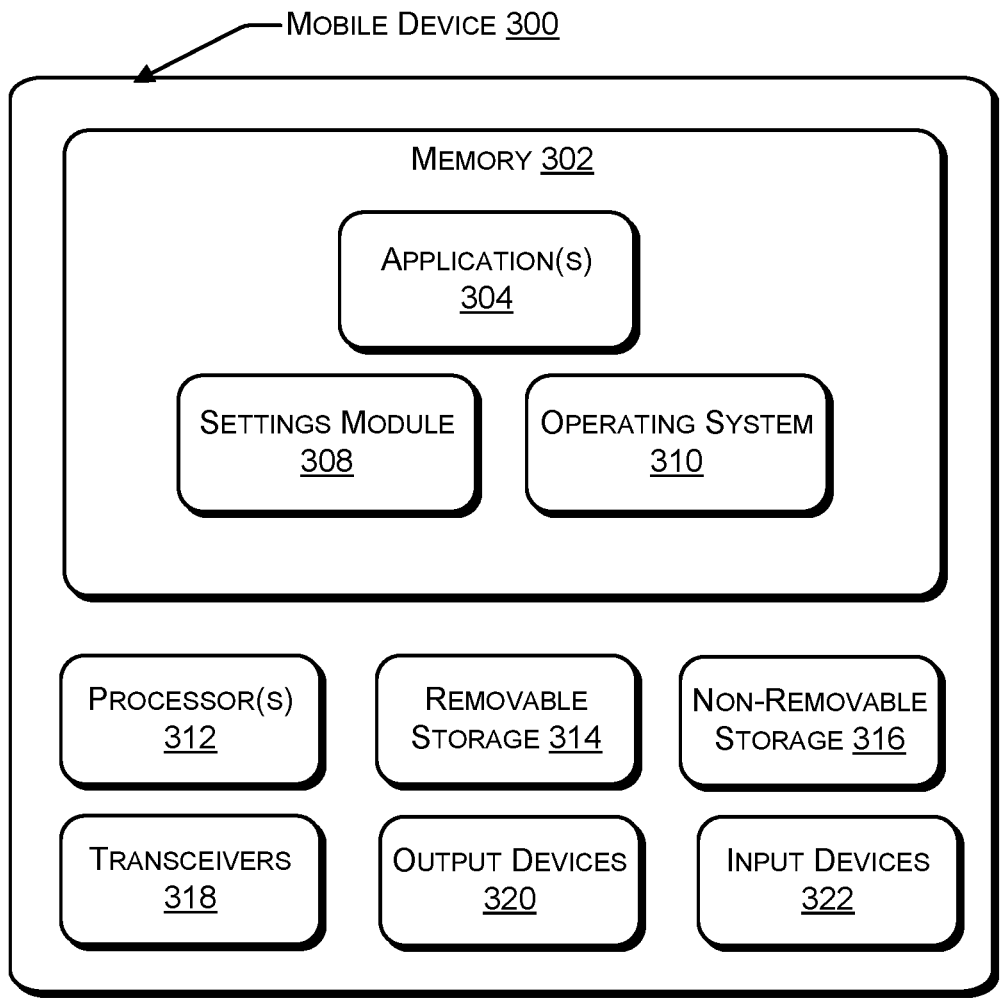
FIG. 3 illustrates a component level view of an example mobile device configured for use in the wireless communication network of FIG. 1.

FIG. 3 schematically illustrates a component level view of a mobile device 300, such as mobile device 102, configured to function within wireless communication network 100. In embodiments, the mobile device 300 may operate as, for example, the computing device 112.

As illustrated, the mobile device 300 comprises a system memory 302 storing application(s) 304, a settings module 308, and an operating system 310. Also, the mobile device 300 includes processor(s) 312, a removable storage 314, a non-removable storage 316, transceivers 318, output device(s) 320, and input device(s) 322. In various implementations, system memory 302 is volatile (such as RAM), non-volatile (such as ROM, flash memory, etc.) or some combination of the two. In some implementations, the processor(s) 312 is a central processing unit (CPU), a graphics processing unit (GPU), or both CPU and GPU, or any other sort of processing unit.

The mobile device 300 may also include additional data storage devices (removable and/or non-removable) such as, for example, magnetic disks, optical disks, or tape. Such additional data storage may include removable storage 314 and non-removable storage 316.

Non-transitory computer-readable media may include volatile and nonvolatile, removable and non-removable tangible, physical media implemented in technology for storage of information, such as computer readable instructions, data structures, program modules, or other data. System memory 302, removable storage 314 and non-removable storage 316 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the user device 300. Any such non-transitory computer-readable media may be part of the user device 300. The processor(s) 312 may be configured to execute instructions, which may be stored in the non-transitory computer-readable media or in other computer-readable media accessible to the processor(s) 312.

In some implementations, the transceivers 318 include any sort of transceivers known in the art. For example, the transceivers 318 may include a radio transceiver that performs the function of transmitting and receiving radio frequency communications via an antenna. Also or instead, the transceivers 318 may include wireless modem(s) to may facilitate wireless connectivity with other computing devices. Further, the transceivers 318 may include wired communication components, such as an Ethernet port, for communicating with other networked devices.

In some implementations, the output devices 320 include any sort of output devices known in the art, such as a display (e.g., a liquid crystal display), speakers, a vibrating mechanism, or a tactile feedback mechanism. Output devices 320 also include ports for one or more peripheral devices, such as headphones, peripheral speakers, or a peripheral display.

In various implementations, input devices 322 include any sort of input devices known in the art. For example, input devices 322 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like. The input devices 322 may be used to enter a code, as previously described herein, to allow the mobile device 300 to access or connect with a particular server, e.g., server 104, to receive services therefrom as previously described herein.

Figure 4:
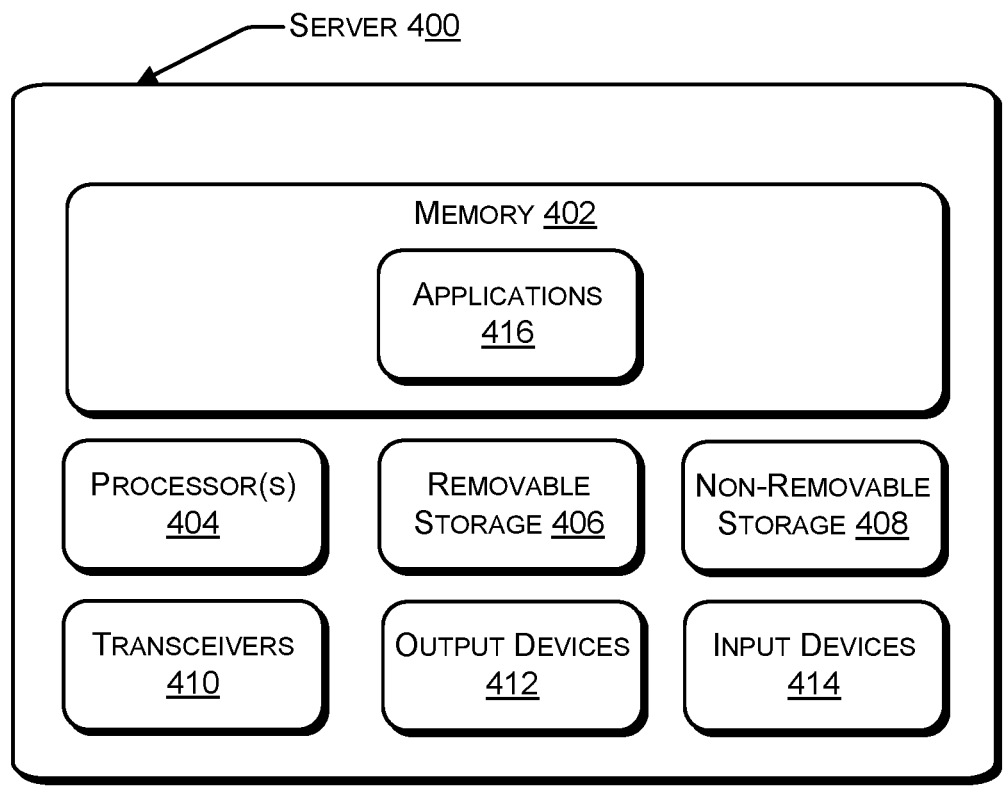
FIG. 4 illustrates a component level view of a server configured for use in the arrangement of FIG. 1 to provide various services of the wireless communication network of FIG. 1.

FIG. 4 schematically illustrates a component level view of a server 400, e.g., server 104, configured for use within a wireless communication network, e.g., wireless communication network 100, in order to provide various services within the wireless communication network, according to the techniques described herein. The server 400 may be located in, for example, a radio network controller (RNC) of the wireless communication network 100 or a gateway of the wireless communication network 100. Additionally, the server 400 may be a separate entity located separately from the RNC.

As illustrated, the server 400 comprises a system memory 402. Also, the server 400 includes processor(s) 404, a removable storage 406, a non-removable storage 408, transceivers 410, output device(s) 412, and input device(s) 414.

In various implementations, system memory 402 is volatile (such as RAM), non-volatile (such as ROM, flash memory, etc.) or some combination of the two. In some implementations, the processor(s) 404 is a central processing unit (CPU), a graphics processing unit (GPU), or both CPU and GPU, or any other sort of processing unit. System memory 402 may also include applications 416 that allow the server to perform various functions. For example, the applications 416 may allow the server 400 to perform functions associated with a MSS server, a TAS, a CSCF server and/or a BGCF server. The applications 416 may also allow the server 400 to receive codes from a mobile device, e.g., mobile device 102, register the mobile device with the wireless communication network and/or identify itself to the mobile device.

The server 400 may also include additional data storage devices (removable and/or non-removable) such as, for example, magnetic disks, optical disks, or tape. Such additional storage is illustrated in FIG. 4 by removable storage 406 and non-removable storage 408.

Non-transitory computer-readable media may include volatile and nonvolatile, removable and non-removable tangible, physical media implemented in technology for storage of information, such as computer readable instructions, data structures, program modules, or other data. System memory 402, removable storage 406 and non-removable storage 408 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the server 400. Any such non-transitory computer-readable media may be part of the server 400.

In some implementations, the transceivers 410 include any sort of transceivers known in the art. For example, the transceivers 410 may include wired communication components, such as an Ethernet port, for communicating with other networked devices. Also or instead, the transceivers 410 may include wireless modem(s) to may facilitate wireless connectivity with other computing devices. Further, the transceivers 410 may include a radio transceiver that performs the function of transmitting and receiving radio frequency communications via an antenna.

In some implementations, the output devices 412 include any sort of output devices known in the art, such as a display (e.g., a liquid crystal display), speakers, a vibrating mechanism, or a tactile feedback mechanism. Output devices 412 also include ports for one or more peripheral devices, such as headphones, peripheral speakers, or a peripheral display.

In various implementations, input devices 414 include any sort of input devices known in the art. For example, input devices 414 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method within a testing environment of a wireless communication network, the method comprising:
    selecting one or more nodes of the wireless communication network in which to perform at least one of (i) one or more tests or (ii) one or more procedures, the one or more nodes including at least one of a call session control function (CSCF) server or a breakout gateway control function (BGCF) server;
    providing, on a testing platform, a listing of a plurality of subscriber identity modules (SIMs) provisioned in a home location register (HLR) for use in the testing environment, the HLR comprising a unified subscriber database (USD);
    based upon the one or more nodes, selecting a SIM of the plurality of SIMs for use in accessing the one or more nodes, the SIM being configured for use with a mobile device;
    based upon the SIM, provisioning of data from the at least one of (i) one or more tests or (ii) one or more procedures with respect to a primary key of the SIM; and
    performing, on the one or more nodes, the at least one of (i) one or more tests or (ii) one or more procedures.

2. The method of claim 1, wherein
    provisioning of data from the one or more tests with respect to the primary key of the SIM comprises provisioning of data from the one or more tests with respect to at least one of an international mobile subscriber identity (IMSI) or a mobile station international subscriber directory number (MSISDN) of the SIM.

3. The method of claim 2, further comprising:
    provisioning of the plurality of SIMs in the USD.

4. The method of claim 1, wherein the one or more tests comprise testing with respect to one or more of messaging applications or data services.

5. The method of claim 1, wherein the plurality of SIMs correspond to a plurality of virtual SIMs.

6. The method of claim 1, wherein the plurality of SIMs correspond to a plurality of SIM cards.

7. A wireless communication network comprising a testing environment, wherein the testing environment comprises a testing platform executed on one or more servers, each server comprising a non-transitory storage medium and instructions stored in the non-transitory storage medium, the instructions being executable by each server to:
- receive a selection of one or more nodes of the wireless communication network for performing one or more tests;
- provide a listing of a plurality of subscriber identity modules (SIMs) provisioned in a unified subscriber database (USD) for use in the testing environment;
- receive a selection for a SIM of the plurality of SIMs for use in accessing the one or more nodes, the SIM being configured for use with a mobile device;
- based upon the SIM, provision data from the one or more tests with respect to at least one of an international mobile subscriber identity (IMSI) or a mobile station international subscriber directory number (MSISDN) of the SIM; and
- cause the one or more nodes to execute the one or more tests, the one or more tests including testing with respect to voice over long term evolution (VoLTE) service, video over long term evolution (ViLTE) service, or rich communication services (RCS).

8. The wireless communication network of claim 7, wherein the instructions are further executable by each server to:
- provision the plurality of SIMs in the USD.

9. The wireless communication network of claim 7, wherein the one or more nodes comprise one or more of a radio access network (RAN) node or an internet protocol core multimedia system (IMS) node.

10. The wireless communication network of claim 7, wherein the plurality of SIMs correspond to a plurality of virtual SIMs.

11. The wireless communication network of claim 7, wherein the plurality of SIMs correspond to a plurality of SIM cards.

12. An apparatus comprising:
- one or more processors; and
- a non-transitory storage medium having instructions stored thereon, the instructions being executable by the one or more processors to:
  - receive a selection of one or more nodes of a wireless communication network in which to perform one or more tests, the one or more nodes including at least one of a call session control function (CSCF) server or a breakout gateway control function (BGCF) server;
  - provide a listing of a plurality of subscriber identity modules (SIMs) provisioned in a home location register (HLR) for use in a testing environment, the HLR comprising a unified subscriber database (USD);
  - receive a selection of a SIM of the plurality of SIMs for use in accessing the one or more nodes, the SIM being configured for use with a mobile device;
  - based upon the SIM, provision data from the one or more tests with respect to a primary key of the SIM; and
  - perform, on the one or more nodes, the one or more tests, the one or more tests including testing with respect to one or more of messaging applications or data services operating on the one or more nodes.

13. The apparatus of claim 12, wherein
the primary key of the SIM comprises at least one of an international mobile subscriber identity (IMSI) or a mobile station international subscriber directory number (MSISDN) of the SIM.

14. The apparatus of claim 13, wherein the instructions are further executable by each the one or more processors to:
- provision the plurality of SIMs in the USD.

15. The apparatus of claim 13, wherein the one or more nodes comprise one or more of a radio access network (RAN) node or an internet protocol core multimedia system (IMS) node.

16. The apparatus of claim 12, wherein the plurality of SIMs correspond to a plurality of virtual SIMs.

17. The apparatus of claim 12, wherein the plurality of SIMs correspond to a plurality of SIM cards.

18. The method of claim 1, further comprising registering the mobile device with the wireless communication network in the testing environment.

19. The method of claim 1, wherein the testing platform is executed on a computing device that is distinct from the one or more nodes.

20. The method of claim 1, wherein the testing platform is executed on the mobile device.

* * * * *